United States Patent [19]

Labb

[11] 4,084,186
[45] Apr. 11, 1978

[54] DETECTION SYSTEM FOR DETECTING SYNCHRONISM BETWEEN TELEVISION VIDEO SIGNALS EMANATING FROM DIFFERENT SOURCES

[75] Inventor: Georges Labb, Paris, France
[73] Assignee: Thomson-CSF, Paris, France
[21] Appl. No.: 683,244
[22] Filed: May 4, 1976
[30] Foreign Application Priority Data
 May 7, 1975 France .................... 75 14330
[51] Int. Cl.² .................... H04N 7/02; H04N 5/04
[52] U.S. Cl. .................... 358/139; 358/149
[58] Field of Search ............ 358/148, 149, 158, 264, 358/267, 10, 139; 324/83 D, 83 R; 328/133, 134; 331/20

[56] References Cited
U.S. PATENT DOCUMENTS 3,443,024   5/1969   Allen et al. .................... 358/149
3,600,690   8/1971   White .......................... 324/83 D
3,968,493   7/1976   Last et al. .................... 324/83 D Primary Examiner—John C. Martin
Attorney, Agent, or Firm—Cushman, Darby & Cushman

[57] ABSTRACT

In one of the channels, a trigger circuit 4 supplies for each synchronization pulse a pulse $I_0$ of which the trailing edge $F_0$ is staggered by $T_0$ in relation to said synchronization pulse; in the other channel trigger circuits supply for each synchronization pulse a pulse I of which the beginning is staggered by $T_1$ in relation to said synchronization pulse and of which the duration is $2\Delta t$, $\Delta t$ defining the permitted tolerance for synchronism. A further circuit detects the noncoincidences of an edge $F_0$ with the presence of a pulse $I_1$ and, in the absence of another detection, memorizes the last noncoincidence detected for a given time (at least equal to the image period for the 625 line CCIR standards).

5 Claims, 1 Drawing Figure

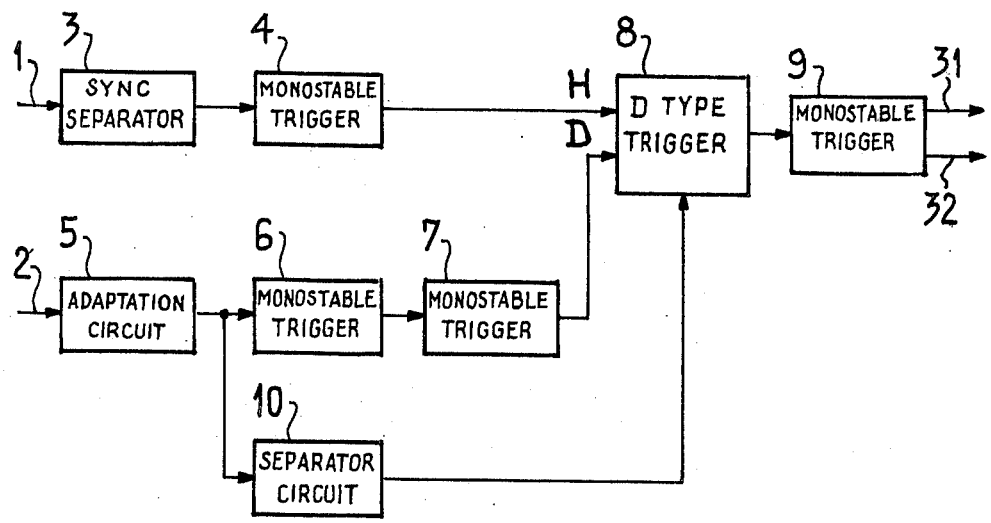

DETECTION SYSTEM FOR DETECTING SYNCHRONISM BETWEEN TELEVISION VIDEO SIGNALS EMANATING FROM DIFFERENT SOURCES

This invention relates to an improvement in detection systems for detecting synchronism between television video signals emanating from different sources.

Detection systems of this kind are used in control rooms in cases where it is desired to create a special effect by mixing two image signals of which at least one emanates from a remote source.

A special effect such as this should only be created if the two image signals are sufficiently synchronous. When this synchronism is not detected, a warning system blocks the detection system used for this purpose or illuminates a pilot lamp warning the operator.

The synchronism detected here is the synchronism of the lines and fields, taking into account the parity of the fields. The detection of synchronism in regard to the chrominance signal in the course of transmission, where the video signals in question are colour television signals, with two alternately transmitted chrominance signals is not effected by the considered system.

In the prior art, the comparison is generally made by isolating the second of the wide pulses of the field synchronisation signal, these pulses being wider than all the other pulses of the mixed synchronisation signal. If these second wide pulses of the field synchronisation signal of two video signals coincide in time and if they are respectively separated from the preceding line synchronization pulse by a common interval in the two video signals, the synchronism of these two signals is assured.

The disadvantages of the conventional system are primarily the temperature drift of the transistors used for converting analogue signals into logic signals, the difficulties of regulation and the complexity of the circuits, in particular for isolating the second wide pulses of the field synchronisation signal of each of the video signals to be compared.

The present invention enables these disadvantages to be obviated.

According to the invention, a detection system for detecting synchronism at two given points between two black and white television video signals or between two luminance video signals, comprises: two inputs for respectively receiving the mixed sync signals of the two signals; a first circuit connected to one of said inputs, for supplying, for each sync pulse included in the signal which it receives, a gate pulse $I_1$ the beginning of which is delayed by $T_1$ ($T_1 \geq 0$) in relation to the beginning of the corresponding sync pulse and the duration of which is equal to $2\Delta t$, $\Delta t$ defining the permitted tolerance for the synchronism, a second circuit connected to the second input for supplying, for each sync pulse included in the signal which it receives, a pulse $I_0$ of which one edge $F_0$ is delayed by $T_0$ ($T_0 \geq 0$) in relation to the beginning of the corresponding sync pulse; and a detection circuit for receiving the pulses $I_0$ and $I_1$ and detecting the non-coincidences of an edge $F_0$ with the presence of a pulse $I_1$ and in the absence of the detection of another noncoincidence over a given period $T'$, memorizing the last noncoincidence detected over said period $T'$, $T'$ being at least equal to a field period of said video signals.

The invention is described in more detail in the following with reference to the accompanying drawing which shows the layout of one embodiment of the invention. It has been assumed purely by way of example that the standards used are the 625 line CCIR standards.

It has also been assumed that one of the two signals to be compared is the local video signal, as is generally, but not always, the case.

The video signals coming from the remote source, wich signal is assumed to have been already clamped, is applied to the input 1 of the circuit shown in the FIGURE. This signal is applied to a sync signal separator 3 (preferably comprising a filter for rejecting the subcarrier if the video signal is a colour television signal, this rejection providing for better comparison of the levels).

The output signals of the separator 3 are applied to a monostable trigger circuit 4 of which the quasi-stable state has a duration of $T_0$. $I_0$ are the output pulses of the trigger circuit 4.

The signal generator producing the signals of the local mixed synchronisation (which applies the mixed synchronisation signals of the local source to the input 2 of the system) is connected by way of an adaptation circuit 5 which adjusts the level 0 of these signals to two monostable trigger circuits 6 and 7 connected in series which, for each sync pulse received from the circuit 5, supply a gate pulse $I_1$ of which the beginning is delayed by $T_1$ (duration of the quasi-stable state of the trigger circuit 6) in relation to the beginning of the corresponding sync pulse, and the duration of which is equal to $2\Delta t$, $2\Delta t$ being an adjustable duration (equal to the duration of the quasi-stable state of the trigger circuit 7).

The pulses $I_0$ are applied to the clock input H, sensitive to the trailing edge of these pulses, of a trigger circuit 8 of the D type of which the signal input D receives the gate pulses $I_1$. Its output is connected to the input of a re-releasable monostable trigger circuit 9 which is sensitive to the transitions 1 – 0 of the output signal of the trigger circuit B.

The trigger circuits 4, 6 and 7 are trigger circuits of which the quasi-stable state may be adjusted in duration. The duration of the quasi-stable state of the trigger circuit 7, giving $2\Delta t$, is with advantage adjustable between 50 nanoseconds and 1 microsecond, $\Delta t$ being the permitted tolerance for the synchronism to be detected.

The following relation should exist between $T_1$ and $T_0$: $T_0 = T_1 + \Delta t + \tau_0 - \tau_1$. The terms $\tau_0$ and $\tau_1$ are corrective terms due to the following reason: the synchronism between the video signals must be the synchronism at the level of the mixer where these video signals may possibly be mixed. Owing to possible path differences, the leading front of a pulse of the signal applied to the trigger circuit 4 at time $t_0$ appears at the level of the mixer at the time $t_0 + \tau_0$, whilst the leading front of a pulse of the signal applied at time $\tau_1$ to the trigger circuit 6 appears at the level of the mixer at the time $t_1 + \tau_1$. Each of the values $\tau_0$ and $\tau_1$ may be positive, zero or negative.

It will be recalled here that the mixed sync signal comprises line sync pulses and field sync signal pulses which in turn comprise line sync pulses, equalisation pulses and wide pulses of which the durations in the 625 line standards are respectively 4.7, 2.25 and approximately 27 microseconds.

The leading edges of any two successive pulses of the mixed sync signal are separated by a minimal distance equal to half the line period, i.e. 32 microseconds in the 625 line standards.

Accordingly, there is no possibility of an overlap between the various pulses $I_0$. An overlap is also impossible between the pulse $I_1$.

$t_0$ denotes the beginning of a given sync pulse S of the video signal coming from outside, whilst $t_1$ denotes the beginning of the synchronisation pulse S' of the local video signal of which the leading front is the closest in time to $t_0$.

The trailing edge of the pulse $I_0$, corresponding to the pulse S occurs at the time $t_0 + T_0$. The gate pulse $I_1$ corresponding to the signal S' lasts from $t_1 + T_1$ to $t_1 + T_1 + 2\Delta t$.

In order that the state 0 be recorded or maintained in the trigger circuit 8 for a considered pulse $I_0$, it is necessary (1) either that (pulse $I_0$ preceding $I_1$):

$$t_0 + T_0 < t_1 + T_1$$

which, since $T_0 = T_1 + \Delta t + \tau_0 - \tau_1$, gives $$(t_1 + \tau_1) > (t_0 + \tau_0) + \Delta t,$$

(2) or that (pulse $I_0$ arriving after $I_1$):

$$t_0 + T_0 > t_1 + T_1 + 2\Delta t$$

which gives $$(t_0 + \tau_0) > (t_1 + \tau_1) + \Delta t$$

Accordingly, a state 0 of the trigger circuit 8 will reliably indicate a synchronism fault at least equal to $\Delta t$ at the level of the mixer.

Assuming in the interests of simplicity that $\tau_0 = \tau_1$, a synchronism fault may show itself at first if there is considerable phase displacement between the line sync pulses. However, the line sync pulses may be in phase without the field sync signals (which only recur identically at the image frequency) being in phase. If the field sync signals are out of phase and the line sync pulses in phase, there will be, at least every two fields, at least one equalisation pulse of the first mixed sync signal (giving rise to the pulses $I_0$), for which there will be no pulse with its leading edge staggered by less than $\Delta t$ in relation to said equalisation pulse in the second mixed sync signal (giving rise to the gate pulses $I_1$). The same reasoning applies where $\tau_0 \neq \tau_1$, taking into account the synchronism at the level of the mixer.

Accordingly, it is necessary to keep the memory of each signal 0 recorded in the trigger circuit 8 over a period T' which is with advantage selected to be slightly greater than the image period, for example T' = 50 ms, T' being the duration of the quasi-stable state of the trigger circuit 9.

On the other hand, the trigger circuit 8 could continuously record a signal 0. In that case, it would be necessary to be able artificially to create transitions 1-0 for regenerating the information of the trigger circuit 9.

To this end, a separation circuit 10 extracts from the signal supplied by the adaptation circuit 5 one or more wide pulses of each field sync signal, this operation being easy to carry out by virtue of the fact that it does not involve here high accuracy, and these pulses are applied to an auxiliary input of the trigger circuit 8 which enables it to pass to state 1 independently of the signals applied to its other inputs, the trigger circuit remaining in the state 1 for the duration of the pulse.

The complementary output 32 of the trigger circuit 9 may be used for actuating an indicator for indicating synchronism and its direct output 31 for actuating an indicator for indicating non-synchronism.

It is obvious that transitions 1-0 of the trigger circuit may also be obtained by causing the trigger circuit 8 to pass to the state 1 by means of the leading edges of the pulses of the local synchronisation signal (if $T_0 \neq 0$), providing this front is sufficiently steep.

It is possible to reverse the parts of the input signals of the systems in regard to generation of the pulses $I_0$ and $I_1$.

The system may of course be used for directly comparing with one another the phases of two video signals emanating from remote sources. In this case, the tolerance $\Delta t$ is divided by 2 in relation to the tolerance used in the opposite case, and two separators are employed for extracting the mixed sync signals.

Generally, the local mixed synchronisation is compared with the mixed sync signals from several outside sources to ensure that the pairs of signals which it will be possible to mix are always known.

In this case, the clock pulses $I_0$ (or the gate pulses $I_1$) supplied by the channel receiving the local mixed sync signal may of course be used for all the comparisons. It is in this case that the circuit 10 is of interest and is naturally used for all the comparisons.

In the example in question, it has been assumed that the 625 line CCIR standards apply. The system may be used for other standards, a duration T' at least equal to the image period sufficing in every case for the duration of the quasi-stable state of the trigger circuit 9. However, depending upon the precise structure of the field sync signal, a duration T' at least equal to the field period may suffice for other standards such that, if the line sync pulses are in phase (at the level of the mixer) without the field sync signals being in phase, there would be, with each field period and in each signal, at least one sync pulse of which the leading edge does not coincide with the leading edge of a synchronisation pulse of the other signal.

The system described above lends itself to modification, for which purpose it is of advantage to take into account the following principles.

The absence of feed of an input receiving a video signal from an outside source will give rise at the output to a synchronism signal rather than a non-synchronism signals which is more convenient for the operator using the synchronism detector.

When the effect of a variant is to render the circuits of one channel more complex than those of the other channel, this channel will be that of the local mixed sync which is normally compared with the mixed sync signals of various outside sources.

Taking into account the relation $T_0 + T_1 + \Delta t + \tau_0 - \tau_1$ and of the need for each of the periods $T_0$ and $T_1$ to be positive or zero, it will be noted that, if $\Delta t + \tau_0 - \tau_1$ is positive, $T_1$ may be zero, in which case the trigger circuit 6 may be omitted from the circuit shown in the drawing, the trigger circuit 7 being directly released by the output pulses from the adaptation circuit 5.

On the other hand, if $\Delta t + \tau_0 - \tau_1$ is negative or zero, $T_1$ may be selected in such a way that $T_0$ is zero, in which case the pulses $I_0$ may be identical with the synchronisation pulses supplied by the separator 3 (providing their leading edge is sufficiently steep) and their useful front $F_0$ would then become their leading front.

In one variant for example, the trigger circuit 8 shown in the drawing may be replaced by a circuit which, for each pulse $I_0$, supplies a brief pulse $J_0$ substantially coinciding with the trailing edge $F_0$ of the pulse $I_0$, these brief pulses $J_0$ being pulses of level 0 separated by intervals of level 1 and by an OR gate receiving the pulses $J_0$ and the gate signals $I_1$ of level 1. The OR gate then transmits the pulse $J_0$ of level 0 when the trailing edge of a pulse $I_0$ does not coincide with a gate pulse $I_1$ and the level 1 in the other cases. The pulses transmitted by the OR gate thus release the trigger circuit 9 for each detection of non-coincidence and the circuit 10 becomes unnecessary.

Another variant is based on the use of an AND gate of which one input receives pulses $J'_0$ of level 1 coinciding with the trailing edges $F_0$ of the pulses $I_0$ and the pulses $I_1$ of level 0 produced which are separated by level "1". Each non-coincidence of an edge $F_0$ with a gate pulse $I_1$ gives rise to an output pulse of the AND gate releasing the trigger circuit 9. There again the circuit 10 is unnecessary.

Of course, the invention is not limited to the embodiments described and shown which were given solely by way of example.

What is claimed is:

1. A detection system for detecting synchronism at two given points between two black and white television video signals or between two luminance video signals, comprising: two inputs and means for respectively applying thereto the mixed sync signals of the two signals, each mixed sync signal including both the horizontal sync pulses and the vertical sync signal pulses of the corresponding video signal; a first circuit connected to one of said inputs for supplying, for each sync pulse included in the signal which it receives, a gate pulse $I_1$ the beginning of which is delayed by $T_1$ ($T_1 \geq 0$) in relation to the beginning of the corresponding sync pulse and the duration of which is equal to $2\Delta T$, $\Delta t$ defining the permitted tolerance for synchronism; second means connected to the second input for supplying, for each sync pulse included in the signal which it receives, a pulse $I_0$ of which one edge $F_0$ is delayed by $T_0$ ($T_0 \geq 0$) in relation to the beginning of the corresponding sync pulse; and a detection circuit for receiving the pulses $I_0$ and $I_1$ and detecting the non-coincidences of an edge $F_0$ with the presence of a pulse $I_1$, to produce a given output signal and retaining the last output signal detected for a given period $T'$ in the absence of the detection of another non-coincidence, $T'$ being at least equal to a field period of said video signals.

2. A synchronism detection system as claimed in claim 1, wherein $T_0$ is positive and wherein said edge $F_0$ is the trailing edge of the pulses $I_0$.

3. A synchronism detection system as claimed in claim 2, wherein said detection circuit comprises a D type trigger circuit $I_0$ having first and second states, and having a clock input for receiving said pulses $I_0$, a signal input for receiving said pulses $I_1$, and an auxiliary input for receiving auxiliary pulses forcing into its first state, if it is not already there, for the duration of said auxiliary pulses, said first and second states of said D type trigger circuit — apart from this case — being the states respectively occupied or retained by the trigger circuit according to whether a pulse $I_1$ is present or absent at its signal input on the occurrence of the trailing edge of a pulse $I_0$ at its clock input, said detection circuit additionally comprising means for applying to said auxiliary input at least one auxiliary pulse during each of the successive time intervals equal to a field period, and a re-releasable monostable trigger circuit of which the quasi-stable state has a duration equal to $T'$, said monostable trigger circuit being responsive to the transitions from said first to said second state of said D type trigger circuit.

4. A synchronism detection system as claimed in claim 3, wherein said means of said detection circuit comprise a circuit for extracting at least one wide pulse from each field sync signal of one of said two mixed sync signals, the extracted wide pulses forming said auxiliary pulses.

5. A synchronism detection system as claimed in claim 1, wherein $T_0$ is equal to zero, said second means are only transmitting means, each pulse $I_0$ supplied for a sync pulse being this sync pulse itself, and wherein edge $F_0$ is the leading edge of the pulses $I_0$.

* * * * *